Jan. 3, 1967  R. T. WALLACE  3,295,165

ELASTIC MELT EXTRUDER

Filed Dec. 6, 1965

Inventor
ROBERT T. WALLACE
By Philip M. Rice
& W. A. Schaich
ATT'YS.

3,295,165
ELASTIC MELT EXTRUDER
Robert T. Wallace, Toledo, Ohio, assignor to Owens-Illinois, Inc., a corporation of Ohio
Filed Dec. 6, 1965, Ser. No. 511,777
4 Claims. (Cl. 18—12)

This invention relates generally to elastic melt extruders and more particularly to new and improved elastic melt extruders which are capable of providing increased extrudate pressures.

The elastic melt extruder plasticizing ability, pigment dispersing capability and extrudate output capacity makes it a desirable tool for providing plasticized material. Unfortunately, its applicability to industrial processes is limited, due to the very low extrudate output pressures it is capable of providing. For example, the maximum extruding pressure obtainable with such an extruder is in the area of 400 pounds per square inch. Most industrial applications, however, require extrudate pressures of at least 2,000 pounds p.s.i.

Therefore, an object of this invention is to provide a new and improved elastic melt extruder.

A further object of this invention is to provide a new and improved elastic melt extruder which is capable of providing industrially suitable output pressures without material increase in size.

Another object of this invention is to provide an elastic melt extruder wherein a pressure generating device is provided downstream of the elastic melt extruder, and means are provided to isolate molten plastic material in the elastic melt extruder from the pressure device.

Figure 1:
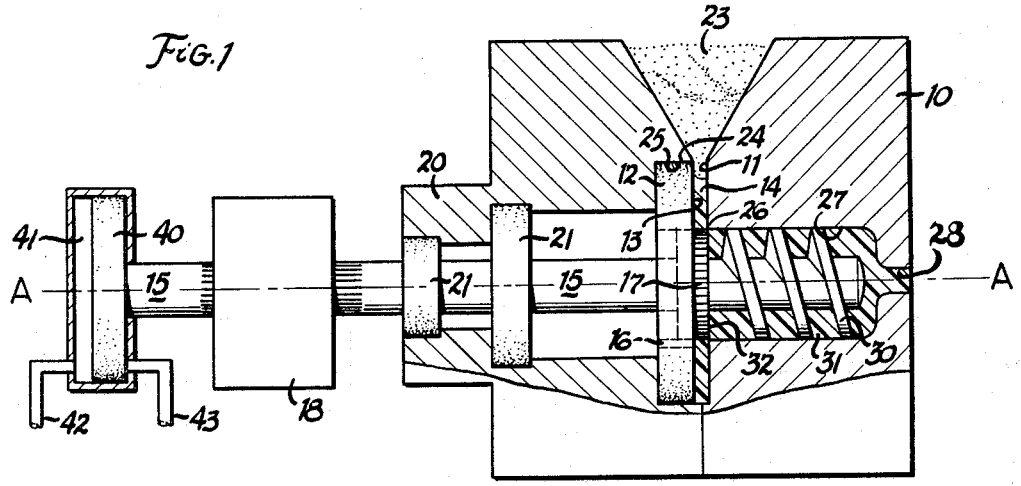
Figure 2:
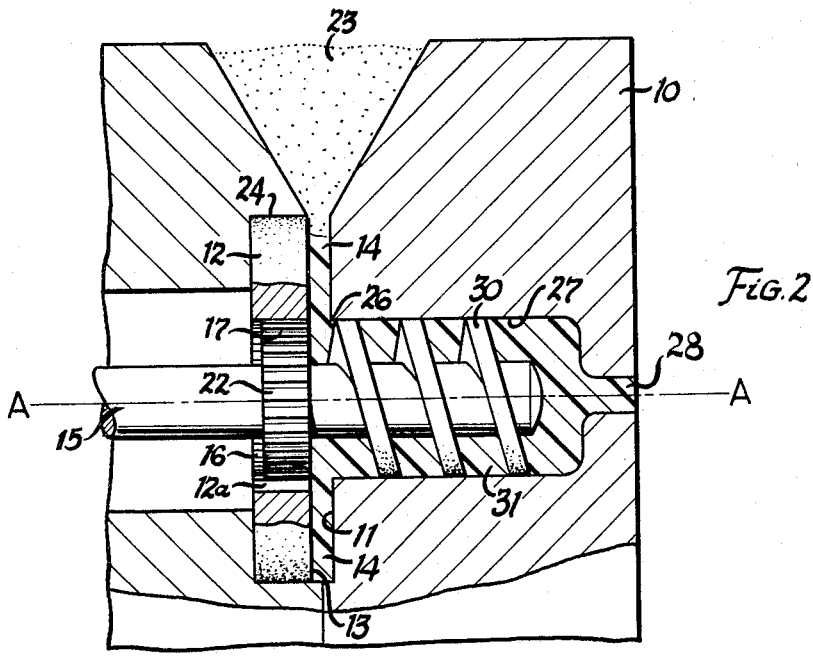

These and other objects will become apparent from a reading of the following detailed description, taken in conjunction with the drawings, wherein:

FIGURE 1 is an elevational view, partially in cross section, of an elastic melt extruder forming one embodiment of this invention; and FIGURE 2 is an elevational view, partially in cross section, of the device of FIGURE 1, shown in a different operating position than that of FIGURE 1.

Before explaining the present invention detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, reference numeral 10 denotes an orifice plate member having an interior plate surface 11. A second plate member 12 is provided with a plate surface 13. These members are mounted upon an axis of relative rotation A—A in spaced relationship so that the plate surfaces 11 and 13 define therebetween a radial channel or gap 14. The axis of rotation A—A may be horizontally or vertically oriented.

In the preferred embodiment and as shown in the drawings, the axis of rotation A—A is horizontally oriented. In this embodiment the channel 14 is linear and forms an angle of 90° with the axis of rotation A—A.

In the illustrated embodiment of FIGURES 1 and 2, the plate member 10 is stationary, and means are provided for rotating the plate member 12. To this end, the plate member 12 is rotatable with a shaft 15. The plate member 12 is provided with splines 16 which mate with splines 17 on the periphery of the shaft 15. More specifically, the shaft 15 is provided with an annular, radially enlarged shoulder 22 which bears the splines 17 at the outer periphery thereof, the splines 17 engaging the splines 16 projecting inwardly from a plate aperture 12a.

The shaft 15 is mounted in axial alignment with the axis A—A by means of a fixed housing 20 and bearings 21. A motor 18 is suitably attached to the shaft 15, as, for example through a splined arrangement (not shown). The plate member 10 is restrained against rotation by attaching it to the housing 20, as by bolts (not shown).

The splined shaft 15 projects through the torque motor 18 which may be either electric or hydraulic, and is secured at its free end to a hydraulic piston 40 enclosed in a cylinder 41. The cylinder receives hydraulic fluid from conduits 42, 43 to displace the shaft 15 axially through a limited distance corresponding to the dimension of the gap 14.

The housing 20 has an interior chamber 25 in which the rotatable plate 12 turns with shaft 15. The front of this chamber 25 is closed by the fixed plate 10 and the rotatable plate 11 is bottomed in the chamber 25 to provide the gap 14 between the surfaces 11 and 13.

Plastic material in pellet form is fed to the gap 14 through a suitable funnel shaped hopper 23 formed by mating hollows in the housing 20 and the fixed plate member 10.

The plate member 10 is provided with a gap or orifice 26 in open communication with the gap 14. Axially downstream of the orifice 26, the plate 10 is provided with a cylindrical bore 27 and an outlet orifice 28 which preferably is in open communication with conventional injection or blow molding equipment. The end of the shaft 15 opposite that of the motor 18 is provided with a peripheral helical screw or auger 30 positioned within the bore 27 which upon rotation of the same pressurizes the plastic material 31 in the bore 27 to force the same out of outlet orifice 28 under a pressure independent of the pressure in the gap 14.

Intermediate the motor 18 and the helical screw 30, the shaft shoulder 22 has a planar forward face 32. The shoulder 22 and the face 32 are of such size as to enter orifice 26, thereby preventing communication between the gap 14 and the bore 27. The motor 18 is adapted to rotate shaft 15 and, when desired, the hydraulic motor assembly 40, 41 is actuated to move the shaft 15 axially with respect to the rotatable plate 12 and fixed plate 10.

When actuated to the right (by introducing fluid through the conduit 42) the shoulder 22 and surface 32 enters the orifice 26 and shuts off further flow of plastic material into the bore 27. During extrusion of plastic material 31 from the bore 27, surface 32 also prevents any backflow of plastic material 31 into the gap 14.

In operation, plastic material in pellet or powdered form is fed into the hopper 23. Rotation of the motor 18, shaft 15 and rotatable plate 12 (which is as shown in FIGURE 2) causes the plastic material to shear between the rotatable plate 12 and the fixed plate 10, resulting in a melting and centripetal feed of the molten plastic material to the center of the fixed plate 10 and rotatable plate 12. The melting and feeding of the plastic material in the gap 14 is as shown in the Maxwell Patent No. 3,046,603, and needs no further description.

Plastic material from the gap 14 flows into the bore 27 in fixed plate 10 through the orifice 26. If desired, the outlet 28 may be closed, as by a valve (not shown), until sufficient plastic material has built up in the channel 27 to fill the same. At this time, the hydraulic motor 40, 41 is actuated to axially shift the shaft 15 from its position, as shown in FIGURE 2, to its position shown in FIGURE 1, sealing off the orifice 26 and thus preventing additional plastic material from entering the bore 27. Continued rotation of the shaft 15 will cause material in the bore 27 to become substantially pressurized and capable of being forced out of the outlet 28 under substantially greater pressure than would be possible without shutting off of the orifice 26.

As shown and described, the rotatable plate 12 and shaft 15 are rotated by the same motor 18. It should be understood that different motors or other conventional means might be utilized to rotate the plate 12 and the shaft 15 together or individually.

I claim:
1. An elastic melt extruder comprising a housing, a fixed plate mounted in said housing and having an orifice therethrough which communicates with an extrusion bore, a rotary plate spaced from said fixed plate to define a melt gap therebetween, means for feeding plastic material to said gap, means for rotating said rotary plate to advance said plastic material centripetally through said melt gap toward said orifice, said rotating means including a shaft corotatable with said rotary plate and axially movable relative to said rotary plate, said shaft having a free end projecting beyond said rotary shaft through said orifice and into said bore, a helical peripheral screw on said shaft free end, a shoulder on said shaft having an end surface normally aligned with said rotary plate and of a size to seal said orifice when said shaft is moved axially to an extent to move said surface across said gap, and means for axially moving said shaft.

2. An elastic melt extruder as defined in claim 1 wherein said shaft and said rotary plate are rotationally interconnected by splines on said shoulder engaging splines on said rotary plate, and said shoulder is of a diameter inwardly of said splines at least as great as the diameter of said orifice.

3. An elastic melt extruder comprising a housing having a fixed plate provided with an opening in the center thereof, a rotary plate spaced from said fixed plate to define a melt gap therebetween, an elongated extrusion channel in open communication with said orifice in said housing, means for feeding plastic material into said gap, means for rotating said rotary plate to melt said plastic material and to centripetally feed said plastic material to said orifice, a shaft through said rotary plate adapted to rotate therewith and axially movable with respect to said rotary plate, said shaft member having on its outer periphery a helical screw located in said extrusion channel, a shoulder on said shaft adapted to seal said orifice when said shaft is moved axially with respect thereto, and means for axially moving said shaft.

4. An elastic melt extruder according to claim 3 wherein said rotary plate opening is splined and the outer periphery of said shaft extending through said opening is splined to permit axial movement of said shaft with respect to said rotary plate while at the same time accommodating constantly driving said plate from said shaft.

References Cited by the Examiner
UNITED STATES PATENTS 3,032,814  5/1962  Miner.
3,137,034  6/1964  Admas _____ 264—176

ROBERT F. WHITE, *Primary Examiner.*

R. B. MOFFITT, *Assistant Examiner.*